H. BAUMGARTNER-MICA.
FLEXIBLE FRICTION COUPLING.
APPLICATION FILED APR. 13, 1907. RENEWED JUNE 5, 1909.
943,804.
Patented Dec. 21, 1909.
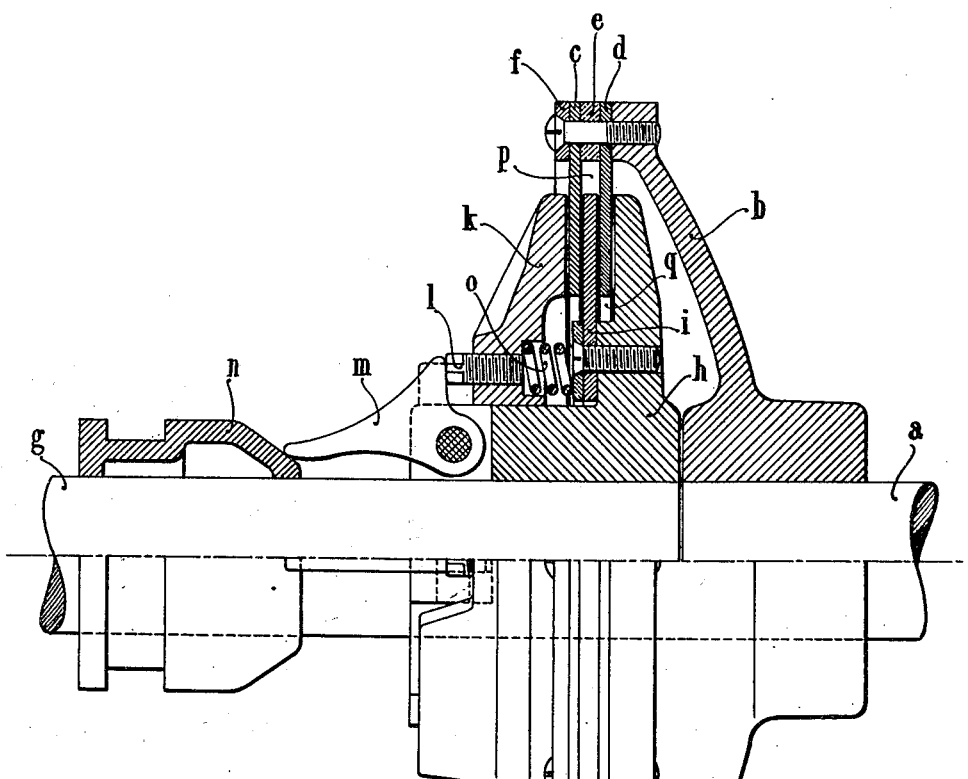
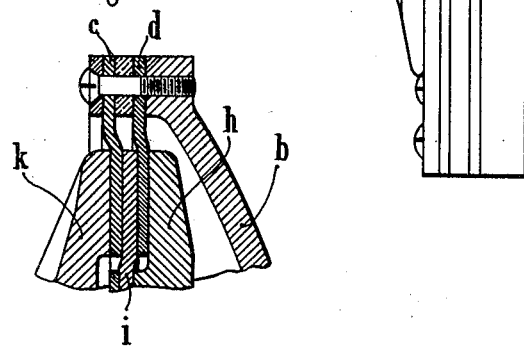
Witnesses:
Alfred Bonhardt
Stanley E. Bramall
Inventor
Hugo Baumgartner Mica
Per J. Bohardt,
Attorney

UNITED STATES PATENT OFFICE.

HUGO BAUMGARTNER-MICA, OF BASEL, SWITZERLAND.

FLEXIBLE FRICTION-COUPLING.

943,804.  Specification of Letters Patent.  Patented Dec. 21, 1909.

Application filed April 13, 1907, Serial No. 368,084. Renewed June 5, 1909. Serial No. 500,430.

*To all whom it may concern:*

Be it known that I, HUGO BAUMGARTNER-MICA, citizen of Switzerland, residing at Basel, Switzerland, have invented new and useful Improvements in Flexible Friction-Couplings, of which the following is a specification.

In flexible friction couplings, owing to the comparatively small specific pressure to which the material of the friction disks is exposed, the segments become disproportionally large, so that the construction of large couplings is not only very expensive but becomes really an impossibility.
The object of this invention is to provide means whereby the said defect is not only obviated but a new technical effect is also obtained consisting in reducing by half the pressure required without reducing the diameter, or in considerably reducing the diameter without reducing the pressure. The flexibility is also considerably increased.

The driven member of a coupling constructed in accordance with this invention, has at least two friction disks made of flexible material and arranged in one plane a distance apart behind each other. Between these two friction disks projects a third disk of flexible and elastic material non-slidably secured to the driving member of the coupling. The said flexible disks are capable of swaying on their points of fixture. By suitable means a disk on the said driving member is so axially displaced that all the said friction disks will be clamped together and the coupling thus brought in gear. I attain this object by the mechanism illustrated in the accompanying drawing, in which—

Figure 1 is partly a side view and partly a longitudinal section, and Fig. 2 a detail of my improved coupling.

Similar letters refer to similar parts throughout the several views.

Referring to the drawing—$a$ is the shaft upon which the driven member $b$ of the coupling is secured which member has attached two friction disks $c$ and $d$. Between these disks, a distance ring $e$ and outside of $c$, a washer $f$ is employed. The driving coupling member $h$ secured upon the shaft $g$ has a friction disk $i$ which projects between the two friction disks $c$ and $d$. The distance between $c$ and $d$ is a little in excess of the thickness of the friction disk $i$. Upon the boss of the coupling member $h$ is employed an axially displaceable pressure disk $k$ in the boss of which are screwed the pressure screws $l$. To the boss of the coupling member $h$ are fulcrumed four angular levers $m$, one arm of each of which is radial and the other axial. The latter projects against a conical collar $n$ axially displaceable upon the shaft $g$ and the radial arm against the pressure screw $l$. Between $h$ and $k$ four spiral springs $o$ are employed which always tend to move the pressure disk $k$ toward the collar $n$, that is to say, to hold the coupling out of gear. The friction disks $c$ and $d$ intersect at $p$ the annular space between $b$ and $h$ and the friction disk $i$ at $q$ the annular space between $h$ and $k$.

The friction disks are each made in four segments arranged in a circle with edges abutting to form a complete disk. In cases where one or both of the members to be coupled are subjected to an electric current, the said disks beside being flexible are also made of electrically insulating material.

The coupling described operates as follows:—By suitable means the collar $n$ is axially displaced toward the coupling, the annular levers $m$ turned thereby and the pressure disk $k$ moved against the flange of the coupling member $h$. This has the effect of pressing together the friction disks and bringing the coupling into gear. Four pairs of friction surfaces are thus caused to act together so that the friction is very large in comparison to the pressure, the same being four times converted into friction. The said annular spaces permit the friction disk to bulge at $p$ and $q$ (Fig. 2), which give a certain play, that is to say, flexibility.

The coupling is thrown out of gear by moving the collar $n$ from the coupling when the spring $o$ will come into action and cause the pressure disk to free the friction disks and the coupling to be thrown out of gear.

I claim:

In a flexible friction coupling, a driven member comprising flexible friction disks and a distance ring between them secured to the said member, a driving member comprising a rigid disk having a boss, a flexible friction disk secured to the said disk projecting between the said flexible disks, a slidable rigid disk and means on the said boss for moving the said slidable disk toward the said bossed disk for clamping together the said flexible disks, all substantially as and for the purpose set forth.

In testimony whereof I have signed my name to this specification in the presence of two subscribing witnesses.

HUGO BAUMGARTNER-MICA.

Witnesses:
    GEO. GIFFORD,
    ANDREW HEER.